(12) United States Patent
Harte et al.

(10) Patent No.: US 10,390,543 B2
(45) Date of Patent: Aug. 27, 2019

(54) FOAMING AND EMULSIFYING PROPERTIES OF HIGH PRESSURE JET PROCESSING PASTEURIZED MILK

(71) Applicants: The Penn State Research Foundation, University Park, PA (US); University of Tennessee Research Foundation, Knoxville, TN (US)

(72) Inventors: Federico Miguel Harte, Matilda, PA (US); Marta Corzo Martinez, Madrid (ES); Maneesha S. Mohan, University Park, PA (US)

(73) Assignees: The Penn State Research Foundation, University Park, PA (US); University of Tennessee Research Foundation, Knoxville, TN (US)

( * ) Notice: Subject to any disclaimer, the term of this patent is extended or adjusted under 35 U.S.C. 154(b) by 474 days.

(21) Appl. No.: 15/185,296

(22) Filed: Jun. 17, 2016

(65) Prior Publication Data

US 2016/0374359 A1 Dec. 29, 2016

Related U.S. Application Data

(60) Provisional application No. 62/186,026, filed on Jun. 29, 2015.

(51) Int. Cl.
*A23C 9/14* (2006.01)
*A23C 9/152* (2006.01)

(52) U.S. Cl.
CPC ........ *A23C 9/1524* (2013.01); *A23C 2210/15* (2013.01); *A23C 2210/30* (2013.01)

(58) Field of Classification Search
CPC ............. A23C 9/1524; A23C 2210/10; A23C 2210/30
USPC ........................................................ 426/580
See application file for complete search history.

(56) References Cited

U.S. PATENT DOCUMENTS

| | | | |
|---|---|---|---|
| 6,511,695 B1 * | 1/2003 | Paquin ............... | A23C 19/0904 426/519 |
| 2008/0152775 A1 * | 6/2008 | Paquin .................... | A23C 3/00 426/584 |

OTHER PUBLICATIONS

Adapa, et al., Functional Properties of Skim Milk Processes with Continuous High Pressure Throttling, Journal of Dairy Science, vol. 80, No. 9, pp. 1941-1948 Mar. 10, 1997.
Dissanayake, et al., Functional Properties of whey proteins affected by heat treatment and hydrodynamic high-pressure shearing, Journal of Dairy Science, vol. 92, No. 4, pp. 1387-1397 Nov. 13, 2008.
Hayes, et al., High pressure homogenisation of raw whole bovine milk (a) effects on fat globule size and other properties, Journal of Dairy Research, vol. 70, No. 3, pp. 297-305 Feb. 14, 2003.
Kheadr, et al., Effect of dynamic high pressure on microbiological, rheological and microstructural quality of Cheddar cheese, International Dairy Journal, vol. 12, pp. 435-446 Jul. 4, 2001.

(Continued)

*Primary Examiner* — Jeffrey P Mornhinweg
(74) *Attorney, Agent, or Firm* — Hodgson Russ LLP

(57) ABSTRACT

Provided are methods for processing milk using one or more procedures that include at least one high pressure treatment, such as High Pressure Jet Processing at a hydrostatic pressure of at least 400 MPa. Food additives and food products that contain processed milk components are also provided, and may be dairy or non-dairy products.

10 Claims, 10 Drawing Sheets

(56) References Cited

OTHER PUBLICATIONS

Kielczewska, et al., The effect of high-pressure homogenization on changes in milk colloidal and emulsifying systems, Polish Journal of Food and Nutrition Sciences, vol. 12, No. 1, pp. 46-46 Jan. 1, 2003.
Lanciotti, et al., Effects of milk treatment with dynamic high pressure on microbial populations, and lipolytic and proteolytic profiles of Crescenza cheese, International Journal of Dairy Technology, Vo. 57, No. 1, pp. 19-25 Feb. 1, 2004.
Hernandez, et al., Manufacture of acid gels from skim milk using high-pressure homogenization, Journal of Dairy Science, vol. 91, No. 10, pp. 3761-3767 Jun. 24, 2008.
High Pressure Homogenization (HPH), Webpage, http://web.utk.edu/~fede?high%20pressure%20homogenization.html Aug. 6, 2011.
Sandra, et al., Effects of ultra-high-pressure homogenization and heating on structural properties of casein micelles in reconstituted skim milk powder, International Dairy Journal, vol. 15, pp. 1095-1104 Nov. 23, 2004.
Thiebaud, et al., High-pressure homogenisation of raw bovine milk. Effects on fat globule size distribution and microbial inactivation, International Dairy Journal, vol. 13, pp. 427-439 Feb. 13, 2003.

\* cited by examiner t=0 hours t> 5 hours t = 24 hours

US 10,390,543 B2

FOAMING AND EMULSIFYING PROPERTIES OF HIGH PRESSURE JET PROCESSING PASTEURIZED MILK

CROSS REFERENCE TO RELATED APPLICATIONS

This application claims priority to U.S. provisional application No. 62/186,026, filed Jun. 29, 2015, the disclosure of which is incorporated herein by reference.

STATEMENT REGARDING FEDERALLY SPONSORED RESEARCH

This invention was made with government support under Hatch Act Project no. PEN04565, awarded by the United States Department of Agriculture/NIFA. The Government has certain rights in the invention.

BACKGROUND OF THE DISCLOSURE

Demand by consumers for natural ingredients with improved and desirable functional attributes is increasing. Hence, there is a strong interest for new processing techniques to enhance the functionality and use of milk proteins. Among physical modification processes, high pressure homogenization (100 to 350 MPa) is a relatively new processing technique for modifying the structure and functional properties of milk proteins. The use of High Pressure Jets Processing (HPJ) in foods is attracting attention as it does not use chemicals, inhibits microorganisms and enzymes and heat-induced damage is lower than thermal treatments, preserving the color, flavor, and nutrient content. However, there is an ongoing and unmet need to improve the functionality of milk proteins, especially their foaming and emulsifying properties. The present disclosure addresses these and other needs.

SUMMARY OF THE DISCLOSURE

The present disclosure relates generally to compositions and methods involving processing of milk. The methods include but are not limited to separation of certain processed milk components, use of the processed components, and foods containing the components.

In general, the method comprises processing milk using one or more procedures that include at least one high pressure treatment, such as high pressure treatment applied using a high pressure jet. In an embodiment the disclosure provides a method for preparing a food additive comprising a processed milk component by subjecting milk to High Pressure Jet Processing (HPJ), wherein the HPJ comprises a hydrostatic pressure is at least 400 MPa, and may be at least, for example, 500 MPa. The method can comprise isolating the processed milk component subsequent to exposing the milk to the hydrostatic pressure, to obtain an isolated processed milk component. In certain non-limiting examples the processed milk component comprises a foam, and/or comprises casein. In certain non-limiting approaches the milk that is subjected to the HPJ is selected from skim milk, or low fat milk, or whole (full fat) milk. In certain embodiments, forming a foam from processed milk comprising, subsequent to the hydrostatic pressure application, mixing the milk to form a foam.

In another embodiment the disclosure provides a food additive that may comprise or consist of an isolated processed milk component that is obtained according to a method of this disclosure. In certain representative examples the food product additive is provided as a component of a food product, which may be in the form of a liquid, a solid or semi-solid. In certain examples the disclosure includes a proviso that a component, food additive, or food product of this disclosure does not contain any lecithin. In embodiments the food product may be a dairy or a non-dairy product.

In one approach the disclosure comprises a method of making a food product comprising an emulsifier, the method comprising subjecting milk to HPJ, wherein the HPJ provides a hydrostatic pressure of at least 400 MPa. Subsequent to exposing the milk to the hydrostatic pressure, a processed milk component is isolated to obtain an isolated processed milk component. The isolated processed milk component is added to the food product to obtain the food product comprising the emulsifier or foaming agent.

DESCRIPTION OF THE DISCLOSURE

All numeric ranges disclosed herein include their upper and lower limits, all integers between the upper and lower limits, and all ranges between the upper and lower limits.

The present disclosure relates to compositions and methods involving processing of milk, separation of certain processed milk components, use of the processed components, and foods containing said components.

In general, the method comprises processing milk using one or more procedures that include at least one high pressure treatment, such as high pressure Jet (HPJ). There are a variety of HPJ processes and devices known and commercially available (commonly known as "WaterJets"), each of which can be adapted for use with the present disclosure, and each of which includes use of high pressure that results in reduction of heterogeneity (i.e., "homogenization") of the processed milk and/or a component(s) of the milk. Methods of the disclosure results reductions in cost of producing the food products and ingredients of described herein, despite relatively high costs of equipment that can be used in some steps of the methods.

In embodiments, the HPJ comprise exposing milk to HPJ using up to 800 MPa of pressure and flow rate from 0.1 to 1000 L/min. In embodiments, the HPJ comprises exposing milk to at between 100-600 MPa. In embodiments, the HPJ comprises exposing milk to at least 200 MPa pressure. In embodiments, the HPJ comprises stepwise changes in pressure, such as increasing or decreasing pressure from 10-100 MPa increments over a period of time, and temperature between 1 and 100° C. In embodiments, the disclosure includes using at least 200-800 MPa pressure, inclusive, and including all integers and ranges of integers there between. In embodiments, the disclosure includes using at least 400, 500, 600, 700, and up to 800 MPa pressure. In preferred embodiments, the disclosure includes at least 400 MPa.

Figure 8:
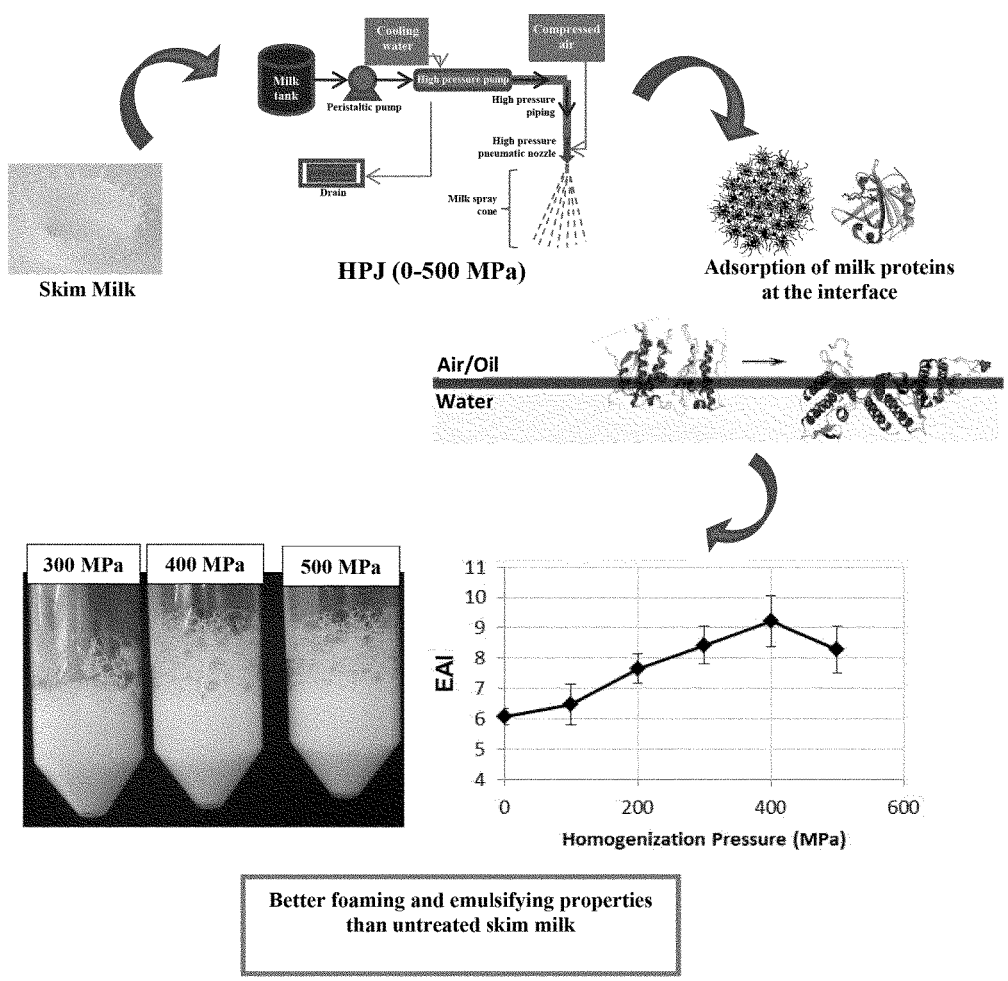
FIG. 8. Graphical depiction of an illustrative flowchart demonstrating an aspect of this disclosure.

In one aspect the disclosure includes the process as generally depicted in FIG. 8, which provides a graphical depiction of an illustrative flowchart that encompasses various embodiments of this disclosure.

In embodiments, the compositions provided by the instant disclosure include but are not necessarily limited to emulsifying agents, casein, casein micelles, foams, and food products that contain one or more milk-derived products as further described herein. In embodiments, the disclosure relates to methods of making and using milk-derived products which have improved foaming properties. Thus, the disclosure in certain embodiments relates to an improved foaming agent and foods that are produced using, and/or which comprise, the improved foaming agent. Any composition and method of this disclosure can include any one or any range of any values, examples of which are described below and which include but are not necessarily limited to stability index, expansion index, emulsion activity index. Particular examples of these indices include foam volume stability index (FVS), emulsifying activity index (EAI), and foam expansion index (% FE). Any such index value can be compared to a suitable reference, such as any suitable control, including but not necessarily limited to a value obtained from control processing that uses a lower pressure than a test sample, such that an improved index value can be observed.

In embodiments, the food products include but are not limited to dairy products, including liquid dairy products such as creams, ice-milks and coffee or other drinks, such as a nutritional supplement drink, having a milk-based component. In certain embodiments the disclosure includes use of processed milk/milk components in bakery products, chocolate and cacao products, cake icings and fillings, salad dressings, frozen dairy products, such as ice cream products, custards, gelato, and refrigerated dairy products, such as novel foamed yogurt products, various cheeses and cheese-containing products, infant formulas, butters, confectionary products, and protein concentrates and isolates, including for use in food products and as stand-alone nutritional supplements, and also as fat replacements and stabilizers. The processed milk components are also suitable for use in a wide variety of non-dairy processed foods, as well as non-food items, including but not necessarily limited to cosmetic products (e.g., creams, shaving foams) and detergents, each of which is encompassed by this disclosure. In embodiments, the food products are characterized by having improved organoleptic properties relative to a reference, i.e., a food product made without use of the high pressure conditions recited herein, and thus the food product may have improved mouth feel and/or taste, and/or less off-taste or burnt taste relative to a reference.

In embodiments the disclosure includes isolated casein aggregates obtained from milk processed as described herein, and food products containing such casein isolates. In embodiments, the disclosure includes casein micelles obtained from milk processed as described herein, and food products containing such casein micelles. In certain embodiments, the disclosure includes protein aggregates (reformed micelles), which can be provided in purified form if desired. In embodiments, the disclosure provides a foam obtained from processing milk according to this disclosure, wherein the foam has a stability that is greater than the stability of previously available milk-derived foams. Casein micelles are protein quaternary structure formed mainly by casein proteins with diameters ranging from 10 to 500 nm. Reformed micelles are newly formed protein aggregates (diameter ranging from 10 nm to 5000 nm) that are formed from single casein proteins due to processing operations.

In embodiments, an index value, such as the foam stability resulting from performing a method of this disclosure, is improved relative to a suitable reference, such as foam stability, over a period of time, such as from 1 minute, to 24 hours, including all minutes and hours and ranges of minutes and hours there between. In embodiments, a foam composition obtained according to this disclosure and using up to 500 MPa has a foam volume stability index that is improved relative to processing milk using lower pressure treatment. A foam is a dispersion of a discontinuous gas phase (e.g., air, nitrogen) in a continuous liquid (e.g., skim milk) or solid phase. In certain embodiments, forming a foam from processed milk, subsequent to the hydrostatic pressure application, comprises mixing the milk to form the foam. Mixing can comprise any procedure that facilitates foam formation, and includes but is not necessarily limited to vortexing, blending, stirring, shaking, agitating, etc. Mixing, such as vortexing, can be performed for any period of time adequate for foam formation, including but not necessarily limited from 15-90 seconds. In certain aspects, such as when processing an ice cream mix, one non-limiting example of which is provided in Table 1, the mixing step can be omitted and yet result in a foam due to the high pressure treatment alone.

In embodiments the method comprises performing HPJ using waterjet technologies. Thus, in general, the milk is subjected to a high pressure treatment in part by using any of a variety of pumps, including but not necessarily limited to any positive displacement pump, piston pump, plunger pump, pneumatic pump, ceramic intensifier pump, and the like, which forces the milk through a means for flow restriction using a ceramic, diamond, sapphire, or ruby nozzle. Forcing the milk through the flow restriction component results in increased hydrostatic pressure and a variety of forces acting on the milk, including but not necessarily limited to turbulence, shear forces, thermal forces, impingement, and cavitation. Without intending to be bound by any particular theory, it is considered that some or all of these forces work to improve the milk-derived products produces according to the current disclosure.

In the present disclosure, it is demonstrated that pasteurized skim and whole milk processed by HPJ up to 500 MPa has greatly improved capacity to form and stabilize foams and emulsions as compared to non-processed skim milk. Pressure of up to 800 MPa can be used. It is expected that this processing technique and modifications thereof that will be apparent to those skilled in the art, given the benefit of the present disclosure, will allow the production of new functional ingredients that contain milk proteins, after a purification process, or in homogenized skim milk with exceptional interfacial properties to be used as fat replacers and stabilizers to improve the formation, stability and eating quality of many dairy and non-dairy processed foods as described herein. Thus, in embodiments, the disclosure includes food products with improved organoleptic properties.

It will be apparent from the foregoing that the present disclosure provides new ingredients which can be used in a variety of low fat food products. Moreover, such products can be labeled without reference to additives that typically are used as fat substitutes in low fat products. In embodiments, the disclosure provides a food product to which a milk-derived component made according to the instant invention is added, such as an emulsifying agent, wherein the food product does not contain other emulsifying additives. In a non-limiting embodiment, the food product does not contain an added lecithin, including but not limited to a hydrolyzed lecithin, and/or a naturally occurring lecithin, and/or a synthetic lecithin. Those skilled in the art will recognize that "lecithin" encompasses a group of yellow-brownish fatty substances occurring in animal and plant tissues. Lecithins are composed of phosphoric acid, choline, fatty acids, glycerol, glycolipids, triglycerides, and phospholipids, including but not necessarily limited to phosphatidylcholine, phosphatidylethanolamine, and phosphatidylinositol. In embodiments, a food product of this disclosure does not contain any such compounds as an additive, such as having been added as an emulsifier. In an embodiment the food product does not contain added soy or egg lecithin. In an embodiment the food product does not contain emulsifiers and foaming agents including polysorbates, polyglycerates, sorbitan oleates and estearates, propylene glycol, succinate, citrate and diacetyltartarate esters of of monoacylglycerols, sodium and calcium stearoyl lactylate, and diacetyltartaric acid esters of monoacylglycerols.

In certain aspects the disclosure is suitable for use with milk obtained from any mammal. In embodiments, the disclosure pertains to milk obtained from an even-toed ungulate.

In embodiments, the mammal is a quadrupedal, ruminant mammal. In embodiments, the mammal is a member of the genus *Bos*, including but not limited to dairy cows and other types of cattle, and yaks. In embodiments, the mammal is a member of the genus *Ovis*, such as a sheep or goats.

In embodiments, the milk processed according to the invention is whole milk, or low fat milk, or skim milk. As is known in the art, the fat content of milk is the proportion of milk by weight made up by butterfat, also referred to as milk fat. The fatty acids of butterfat comprise, by mass fraction, saturated and unsaturated fatty acids. The saturated fatty acids comprise: Palmitic acid: 31%, Myristic acid: 12%, Stearic acid: 11%; Lower (at most 12 carbon atoms) saturated fatty acids: 11%; pentadecanoic acid and heptadecanoic acid: traces. Unsaturated fatty acids comprise: Oleic acid: 24%; Palmitoleic acid: 4%; Linoleic acid: 3%; and alpha-Linolenic acid: 1%. Skim milk contains less than 0.5% butterfat, typically 0.1%. Lowfat milk contains between 0.5-2% butterfat, and includes 1% and 2% varieties. Whole milk contains at least 3.25% fat. In embodiments, milk used in embodiments of this disclosure comprises low fat, skim milk, or whole milk. As is known in the art, removing fat typically causes a decrease in foaming; thus the present disclosure provides a solution to previously limited foaming when using skim milk or low fat milk or derivatives thereof as an additive.

In embodiments, the disclosure includes a food product comprising a milk component processed as described herein, wherein the food product is a liquid food product, or a semi-solid, or solid food product provided in a container, including but not limited to a plastic or glass vessel, such as a bottle, a plastic or paper-based carton or box, or a polymeric wrap, such as a cellophane, or a tinfoil wrap. In embodiments, the container comprises printed material, such as a label, which identifies the food product ingredients in the container, and my further provide information as to the emulsifier used in the container, and may further or alternatively provide information as to what is not included in the ingredients, such as synthetic or other non-milk or protein based emulsifiers. Thus, in embodiments, the label may be a so-called clean label.

The following examples are meant to illustrate but not limit the invention.

EXAMPLE 1

The Examples of this disclosure relate in part to caseins, which are amphiphilic proteins with interfacial properties allowing them to stabilize foams and emulsion systems. As will be evident from the description below, we studied the changes in foaming and emulsification properties of milk proteins from pasteurized skim milk processed using high pressure jet (HPJ) up to 500 MPa (100 MPa increments). Milk foams were prepared by vortexing 50 mL milk for 1 min in a centrifuge tube. The emulsions were prepared by rotary homogenization of sunflower oil and milk in the ratio 1:4 (v/v) at 16,000 rpm for 1 min and measured as the turbidity of the emulsion at 500 nm. The percentage foam expansion index related to the initial foam volume increased from 60 to 110% on increasing the HPJ pressure from 0 to 500 MPa. The percentage foam volume stability index indicated by the foam volume remaining after 5 min, 15 min, 1 hr, 5 hrs and 24 hrs as a percentage of the initial foam volume, was higher as the HPJ pressures increased above 300 MPa. Five hours after foaming, no foam was present in control skim milk (0 MPa). The emulsion activity index of the milks, increased above 200 MPa HPJ pressure with maximum exhibited by 400 MPa milk. Cryo-TEM of milks indicated the formation of networks of protein aggregated in 500 MPa milk. In total the emulsifying and foaming abilities of pasteurized skim milk was best above HPJ of 300 MPa, which could be attributed to the structural changes occurring in the casein micelles on or soon after HPJ. This opens up new avenues for utilizing HPJ milk and milk proteins as new functional ingredients to enhance the foaming and emulsification properties in low fat dairy and non-dairy processed foods. The following is an expanded description of the materials and methods and results that are encompassed by the present disclosure.

Foamability

Foaming Properties of HPJ Milk Samples

Milk foams were prepared by stirring process during which mechanical energy overcomes the interfacial free energy of the system. During the course of foaming, milk proteins tend to adsorb at the air-water interface of the milk foam, reducing the interfacial tension between the air and water and thereby facilitating the formation of small gas bubbles. Foamability in as used herein refers to the propensity of milk to foam and is determined by the rapidity with which the proteins can move to the air-water interface. In this disclosure, foamability of control skim milk (SM) and HPJ SM samples was determined as the volume of foam formed from 10 mL of milk, described as foam expansion index (% FE).

Figure 1:
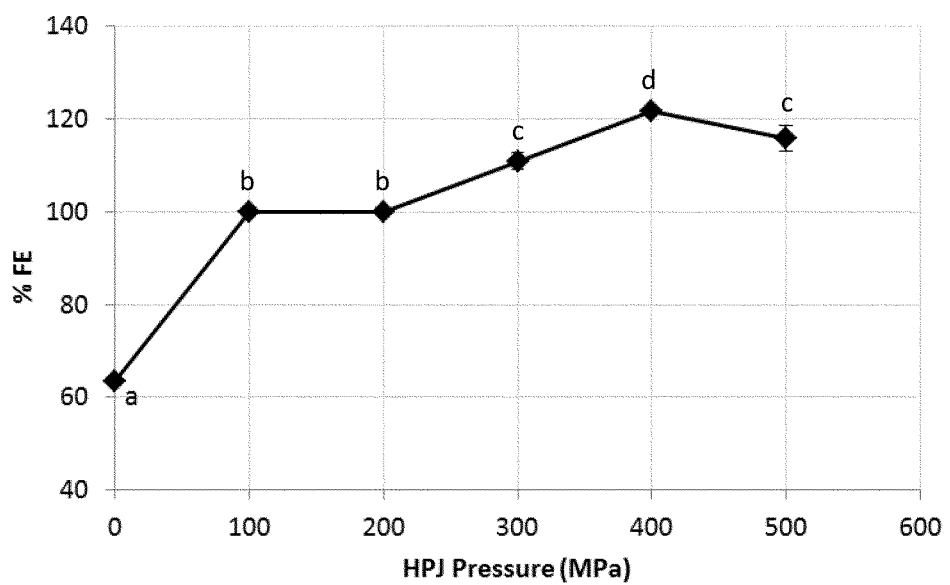
FIG. 1. Foam expansion index (% FE) for control skim milk at 0 MPa and skim milk samples subjected to HPJ pressures from 100 to 500 MPa.[a-d] Different case letters indicate statistically significant (P<0.05) differences.

% FE values of samples are shown in FIG. 1. SM at 0 MPa showed a relatively high FE, due to the natural foaming capacity of milk proteins because of their high amphiphilic character and solubility at neutral pH conditions utilized in this disclosure. However, as observed in FIG. 1, HPJ significantly ($P<0.05$) increased the foam-forming capacity of milk proteins, SM subjected at 300, 400 and 500 MPa showing the highest % FE values. Caseins are known to adsorb to interfaces in dairy foams much better than whey proteins, dominating the air-serum interface and playing a central role in determining the foaming properties of milk.

Without intending to be constrained by any particular theory, the higher % FE values of the SM subjected to 100 MPa as compared to control SM at 0 MPa (FIG. 1) might be due to the partial disruption of the casein micelles at this pressure value, since partial dissociated caseins are more surface-active than micellar caseins and adsorb preferentially onto the air-serum interface of milk foams.

Foam Stability

Figure 2:
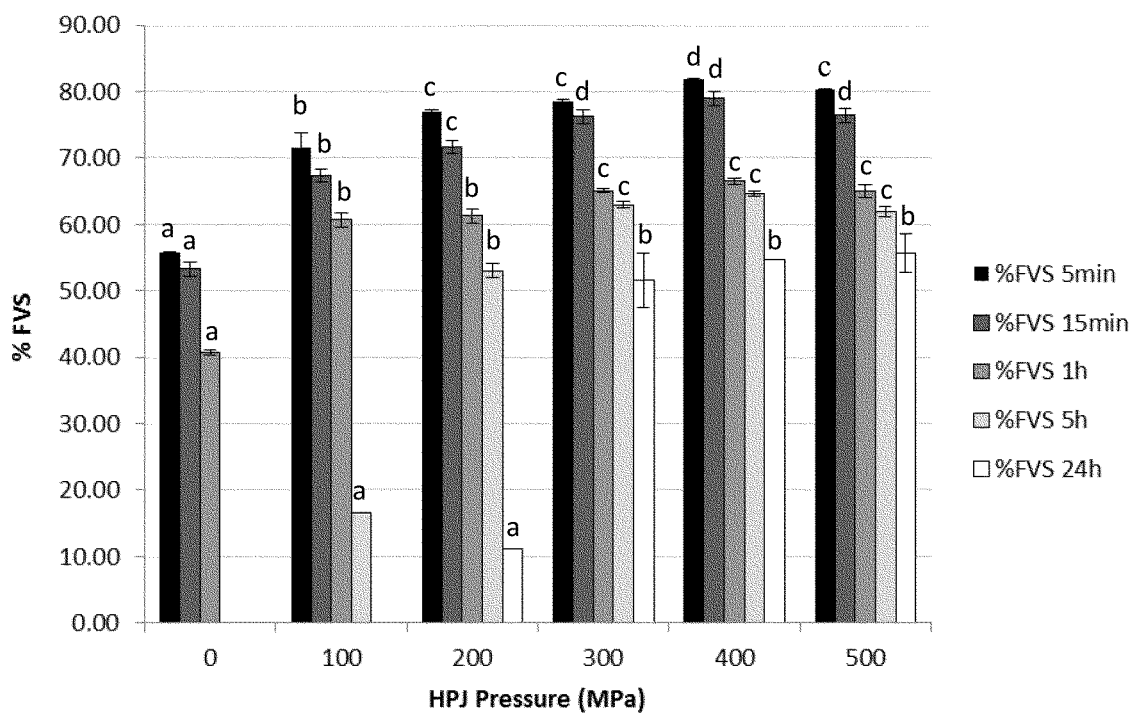
FIG. 2. Foam stability index (% FVS) for foams formed from the control skim milk at 0 MPa and skim milk samples subjected to HPJ pressures from 100 to 500 MPa after 5 min, 15 min, 1 h, 5 h and 24 h of storage at room temperature.[a-d] Different case letters indicate statistically significant (P<0.05) differences among the % FVS values obtained for foams at the same storage time.

Foam stability refers to the ability of the foam to retain its volume as a function of storage time and conditions. Stability of SM foam is determined by the ability of the adsorbed proteins at the air-water interface to form a cohesive viscoelastic film via formation of intermolecular bonds (Damodaran, S. (1997). *Food proteins and their applications* (Vol. 80): CRC Press). In the present disclosure, foam stability was measured by determining foam volume as a function of storage time (24 h) at room temperature, described as foam volume stability index (FVS). Values of FVS observed for control SM 0 MPa and HPJ SM foams are shown in FIG. 2. After 5, 15 and 60 min of storage, the volume of the control SM foam was reduced to 44%, 47% and 60%, and at 5 h, milk foam was completely broken. Foams formed from HPJ milk samples showed significantly higher FVS values than that formed from control SM at 0 MPa (FIG. 2). Foam formed from SM 100 showed a FVS value of 61% after 1 h of storage, this value being<50% after 5 h of storage. However, for foams formed from SM subjected to 200 to 500 MPa, values of FVS was higher than 50% after 5 h of storage and, even, after 24 h for foams of SM 300 and 400 MPa, the highest FVS being observed for foam of SM 400 MPa.

Figure 3:
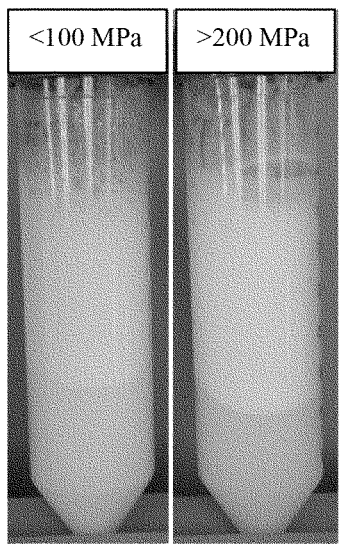
FIG. 3. Images of foams formed from HPJ skim milk subjected to 0 to 500 MPa after time (t; hours) of storage at room temperature.
Figure 3:
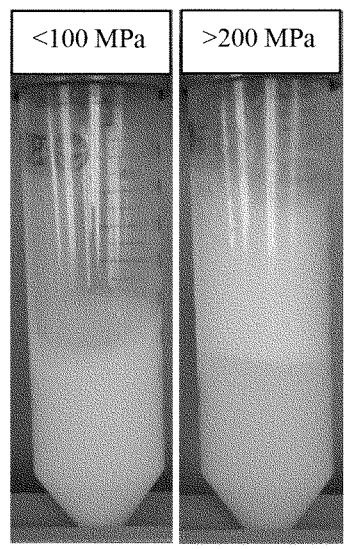
Figure 3:
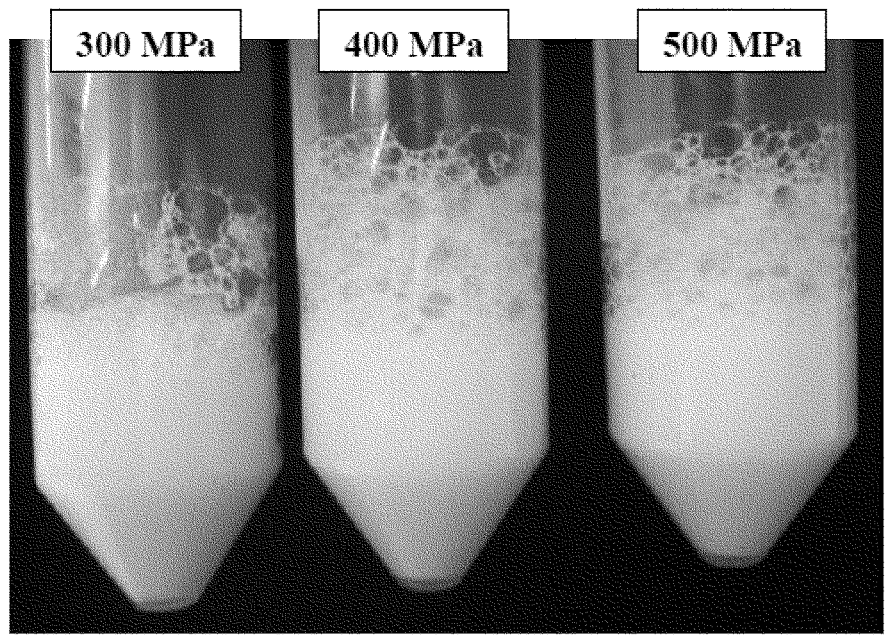

At the same time of the reduction in the foam volume, changes in the air bubble size were also observed, SM foams becoming coarser during storage. Changes in the appearance of skim milk foams as a function of storage time following foaming are known, and include strong broadening of the air bubble size distribution and a notable change in shape of the foam bubbles, from initial spherical bubbles in the foam shortly after foam formation to more irregular shapes following storage of the foam. Such changes are related to the stability of the gas bubbles in the foam, which is defined by three processes: (i) disproportionation of gas bubbles; (ii) drainage of liquid from the foam; and (iii) coalescence of gas bubbles. It has been observed that the volume of liquid underneath the foam steadily increases with increasing storage time, whereas the height of the top of the foam column remains relatively unaffected. This suggests that the reduction in the volume of skim milk foams is primarily because of drainage of liquid from the foam, which can be described as the upward movement of air bubbles as a result of the difference in density between the air bubbles and the continuous phase; concomitantly, the continuous phase between the bubbles undergoes a downward motion. As a result, the foam bubbles become separated only by flat layers, called lamella, and attain a polyhedral shape. Such structure in turn heightens conditions for bubble coalescence, which involves the irreversible binding of two or more foam bubbles, where the interfacial film drains and is eventually ruptured forming a single larger bubble, and is generally the most severe form of instability. This "dry" polyhedral type structure was clearly observed in the foam formed from control SM and SM 100 after 15 min and between 1 and 5 h of storage, respectively. The formation of these dry structures was followed by the coalescence and, finally, the rupture of the air bubbles after 24 h of storage (FIG. 3). Foams formed from SM at 200 to 500 MPa also became coarser; however, unlike skim milk at 0 and 100 MPa, the foam lamellae around smaller bubbles remained well defined after 24 h for foams of SM 300 to 500 MPa (FIG. 3) suggesting that rupture of bubbles was less frequent than in foams of SM 0 and SM 100 MPa.

As discussed above, the primary air-serum interface of skim milk foams is made up of dissociated caseins and whey proteins. However, micellar caseins, although not forming an integral part of the air-serum interface, play an important role in the stabilization of milk foams via adsorption-induced spreading and aggregation at the primary interface to form a more rigid stable film. In fact, the ability of casein micelles to aggregate and form a stable network at the bubble interface has been reported to be a prerequisite to forming stable milk foams. On the other hand, several studies have demonstrated that increasing the viscosity, creaming of the air bubbles and downward flow of the continuous phase is impaired and, hence, the rate of drainage is reduced. Likewise, it has been reported that higher viscosity promotes smaller bubble size, due to decreased rates of coalescence and, hence, the susceptibility of the film to collapse. This may help explain the improvement observed in the stability of the foams formed from HPJ SM with increasing pressure from 100 to 500 MPa as compared to that of the foam of SM 0 MPa. So that, the increase in viscosity of the milk with increasing HPJ pressure as a consequence of the structural changes induced in the casein micelles by HPJ is largely responsible for the improvement observed in the foam stability after HPJ treatment of skim milk. Besides the increase in milk viscosity, structural changes in casein micelles induced by HPJ in combination with the shear-induced higher temperature in the nozzle might also contribute to the stability of the foams formed from HPJ milks.

Thus, the improvement observed in the stability (higher % FVS values) of the foam formed from SM subjected to 100 MPa as compared to that of control SM (FIG. 2) might be related to its higher foamability (FIG. 1). Likewise, the higher stability of foams formed from HPJ SM at 200, 300 and 400 MPa could be due to the capacity of the different types of protein structures formed during the HPJ treatment to adsorb at the primary air-serum interface of dissociated caseins and whey proteins, spread fast by the interface and aggregate via hydrophobic interactions or by forming disulphide bonds via thiol-disulfide exchange between β-1g and with caseins, giving rise to an interfacial film with high rigidity and cohesion, resistant against destabilization mechanisms. However, the structural changes occurred in casein micelle structure during the HPJ is not fully determined and the mechanism of formation of the reformed micelles remains to be established.

Emulsifying Properties of HPJ Milk Samples

Emulsifying Activity

Figure 4:
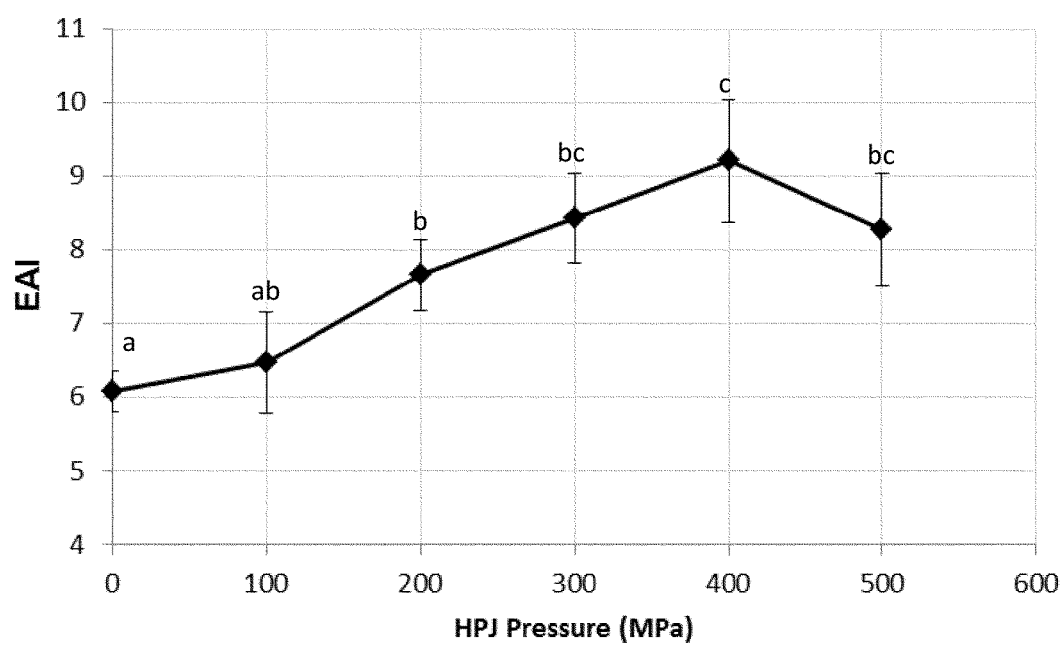
FIG. 4. Emulsifying activity index (EAI) for control skim milk at 0 MPa and skim milk samples subjected to HPJ pressures from 100 to 500 MPa.[a-c] Different case letters indicate statistically significant (P<0.05) differences.

During the course of emulsification, milk proteins, mainly caseins, rapidly adsorb at the surface of the newly formed oil droplets that reduces the interfacial tension, facilitating the stabilization of oil droplets. Hence, the rapidity with which caseins can move to the oil-water interface determines the emulsifying properties of milk. Capacity of control SM and HPJ milk samples to form emulsions (emulsifying activity) was determined by spectroturbidity (absorbance at 500 nm) as the emulsifying activity index (EAI). EAI values for emulsions formed with studied milk samples are shown in FIG. 4. In general, HPJ treatment improved the emulsifying activity of the skim milk, emulsions formed with HPJ SM 200 to 500 MPa showing EAI values significantly higher (P<0.05) than that formed with the control SM at 0 MPa. Similarly for results from foamability assay (FIG. 1), emulsions with the highest EAI values were those formed with skim milk HPJ at the 300 to 500 MPa high pressure range as emulsifying agent. As discussed above for foamability results, this could be attributed to the faster and stronger adsorption at the oil-water interface of the high pressure-induced reformed micelles due to the increased surface hydrophobicity conferred by the denatured whey proteins on their surface, and also to the higher molecular flexibility of the newly formed casein micelles in the HPJ treatment.

Emulsion Stability

Figure 5:
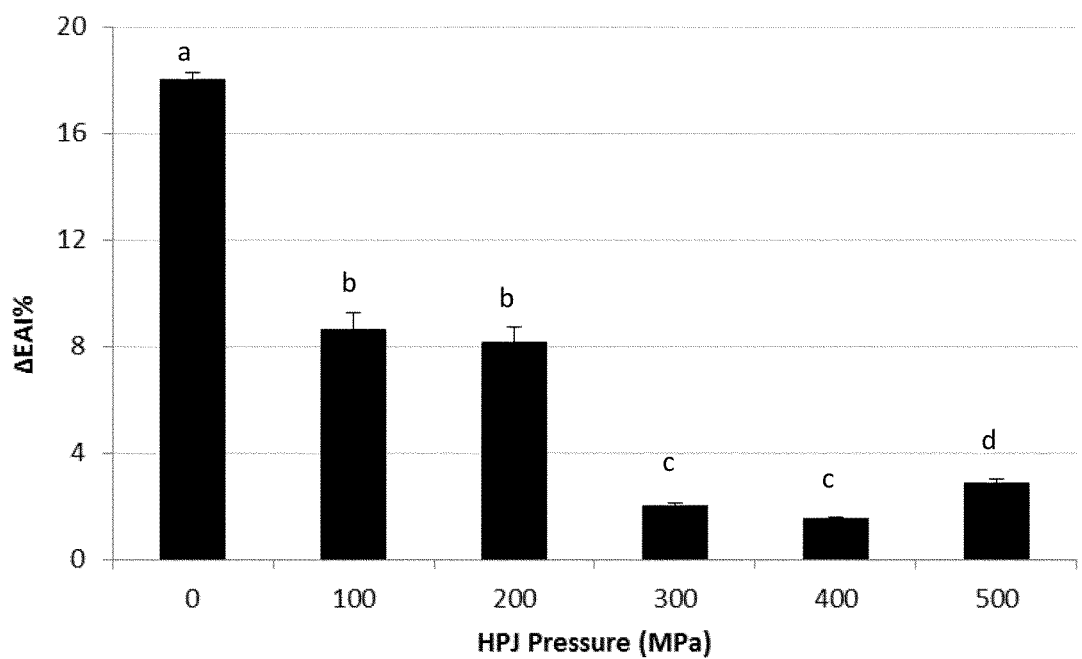
FIG. 5. Emulsion stability index ($\Delta$EAI %) for control skim milk at 0 MPa and skim milk samples subjected to HPJ pressures from 100 to 500 MPa.[a-d] Different case letters indicate statistically significant (P<0.05) differences.

The stability and rheological properties of emulsions is correlated to a large extent to the interactions between the droplets, which in turn depend on the structure and composition of the adsorbed milk protein layers at the surface of the fat globules. So that, in our emulsions, stability is determined by the ability of the milk proteins, mainly caseins, adsorbed at the air-water interface to form thick layers by interacting with themselves and with the aqueous phase components which prevent oil droplets from destabilization by creaming, coalescence and/or flocculation via steric and electrostatic stabilization mechanisms. In the present disclosure, emulsion stability was determined by spectroturbidity as the ΔEAI % index which gives information on the emulsion stability over the storage time and against high temperatures. So that the smaller the value of ΔEAI %, the better the emulsion stability. As observed in FIG. 5, HPJ treatment significantly (P<0.05) improved the emulsion-stabilizing capacity of skim milk with respect to the control SM at 0 MPa. Moreover, similarly to results from determination of foam stability, the lowest ΔEAI % values were observed for emulsions formed with skim milks subjected to 300 to 500 MPa (FIG. 4) which indicates that these samples possess the highest capacity as emulsion stabilizers giving rise to greatly stable emulsions against rapid coalescence and flocculation. As commented above for the case of milk foams, this is most probably due to the increase in viscosity observed in the HPJ milk samples with the increasing pressure, although structural changes in casein micelles induced by HPJ in combination with the shear-induced higher temperature in the HPJ nozzle might also contribute to the improved stability of the emulsions.

Turbidity and Cryo-TEM of HPJ Milks

The formation and stability of the emulsion and foam system is determined by the interfacial properties of the surface active components used in the formulation. In the case of skim milk, which contains very small amounts of fat, milk proteins determine its foaming and emulsifying behavior. Therefore, knowing the changes produced in protein structure during the HPJ treatment is desirable to understand the effect of the HPJ on the foaming and emulsifying properties of skim milks subjected to high pressures from 100 to 500 MPa.

Figure 6:
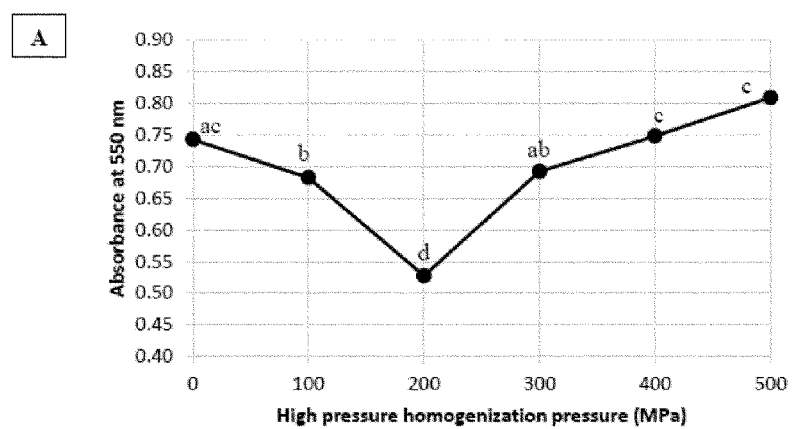
FIG. 6. Turbidity of pasteurized skim milk HPJ processed at different pressures (0 to 500 MPa) adjusted to pH 7 (Standard error of 0.014) and cryo-TEM images of skim milk at 0 MPa (B) and HPJ at 500 MPa (C).[a-d] Different case letters indicate statistically significant (P<0.05) differences.
Figure 6:
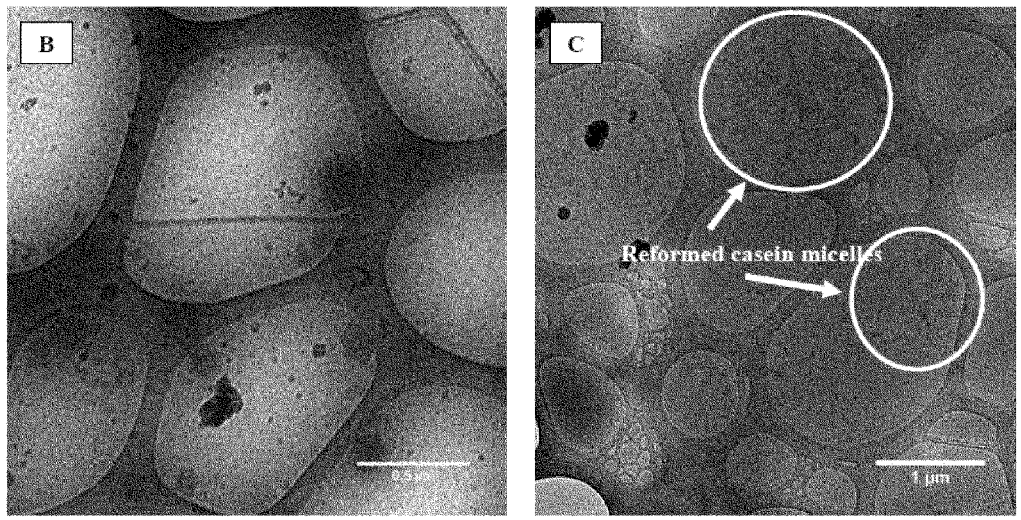

The type of equipment used for milk processing influences the effect of HPJ on casein micelle structure, making it challenging to make a direct comparison of results of studies carried out with different devices. In the present study the turbidity of the milk samples decreased on increasing the HPJ pressure from 0 to 200 MPa and then increased on increasing the HPJ pressure further up to 500 MPa (FIG. 6A). Through cryo-TEM we observed the presence of micelles reformed from protein aggregates at 500 MPa by scanning transmission electron microscopy as compared to the open and porous structure of the native casein micelles (FIG. 6B). Although a slight disruption and transformation of the structural characteristics of the casein micelles were observed on increasing HPJ pressure from 0 to 200 MPa, by our present HPJ technique (FIG. 6A), the mechanism again is unknown. New protein complexes possibly were constituted by casein aggregates that are dispersed in the milk system forming an integrated protein network, as observed in cryo-TEM images of SM treated at 500 MPa (FIG. 6C).

It is well-known that protein structure is greatly affected by temperature. This arose from the adiabatic heating due to high pressure, in addition to high shear, turbulence, and cavitation when sample passed through the HPJ nozzle. Our values of temperature of HPJ skim milk soon after collection were lower because of the presence of the heat exchanger at the exit of the diamond nozzle, temperature of milk samples being ~18° C. throughout all experiment. The low temperatures of sample at the exit of the heat exchanger could alter the casein micelle structure due to the migration of β-casein out of the micelle. Therefore, without intending to be constrained by any particular theory, we assume that alteration of the skim milk functionality after HPJ treatments from 100 to 500 MPa a combination of of: i) hydrostatic pressure within the HPJ pump promoting whey protein denaturation and casein micelles dissociation; ii) shear stress and shear induced increase in temperature in the fixed diamond nozzle also promoting whey protein denaturation and casein dissociation; and iii) low temperature in the heat exchanger after HPJ determining casein aggregation at atmospheric pressure.

Intrinsic Fluorescence of the HPJ Milk Samples

We measured structural changes promoted in casein micelles by HPJ, intrinsic fluorescence ($S_1$) at $\lambda_{ex}$ of 280 and 295 nm which is associated with tryptophan and tyrosine and only with tryptophan, respectively. Previous studies have demonstrated that changes in the emission spectra of tryptophan and tyrosine, both located in the hydrophobic core of casein proteins, are due to protein structural changes, as these changes affect the local environment that surrounds the indole ring, causing shifts of wavelength of maximum fluorescence and fluorescence intensity.

Figure 7:
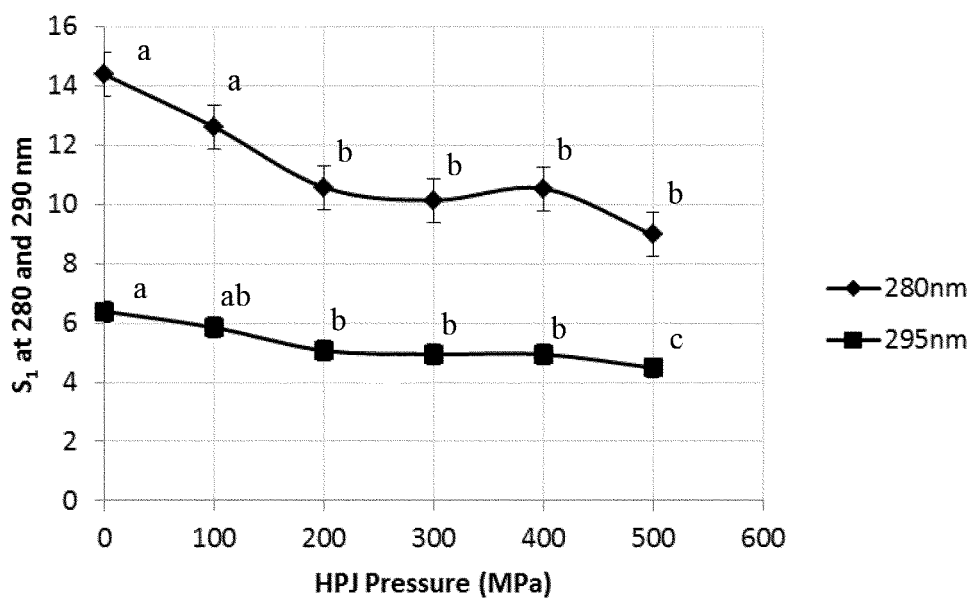
FIG. 7. Intrinsic fluorescence ($S_1$) of the three replications of control skim milk at 0 MPa and skim milk samples subjected to HPJ pressures from 100 to 500 MPa recorded at an excitation wavelength of 280 (A) and 295 (B) nm and emission wavelength ranging from 300 to 600 nm.[a-c] Different case letters indicate statistically significant (P<0.05) differences.

As observed in FIG. 7, the intrinsic fluorescence at both 280 and 295 nm showed a similar trend of decreasing fluorescence intensity (FI) with increasing HPJ pressure. The highest $S_1$ values were observed at 0 MPa ($S_1$=14.4) and 100 MPa ($S_1$=12.6) and this significantly decreased (P<0.03) with increasing homogenization pressure. The decrease in fluorescence intensity at $\lambda_{ex}$ of 280 and 295 nm as a result of the HPJ processing at ≥200 MPa can be associated with intermolecular quenching of Trp and Tyr residues. These results suggest the formation of interactions among Trp residues of the casein proteins with themselves or with whey proteins during the HPJ treatment, especially from 200 MPa, which is in agreement with the re-aggregation previously observed during HPJ treatment above 200 MPa (FIG. 1). Such casein micelle aggregation can lead to a decrease in molecular hydrophobicity, as indicated by the intrinsic fluorescence quenching, which might notably affect the migration capacity of proteins to the interface and, hence, to their foamability and emulsifying properties.

No correlation was observed between the foamability and the intrinsic fluorescence of the skim milk subject to 100 to 500 MPa, since the decrease in intrinsic fluorescence due to the compaction and aggregation of casein micelles during the HPJ treatment should result in a decrease of milk foamability of skim milk. However, as clearly observed in FIG. 1, HPJ milks gave rise to higher volume of foam after stirring. Without intending to be bound by any particular theory, it is considered that a key to explaining the exceptional foamability of skim milk HPJ at the 300 to 500 MPa pressure range is likely in the structural changes induced in milk proteins, particularly casein micelles, by HPJ in combination with the shear-induced higher temperature in the HPJ nozzle. However, despite the number of attempts to understand such structural changes as well as the nature of the resulting protein aggregates (reformed micelles), these are not fully known.

EXAMPLE 2

Materials and Methods
High Pressure Jet Processing of Skim Milk

Commercial pasteurized skim milk was purchased from a local grocery store and stored at 4° C. until use. The milk was processed at HPJ from 500 to 100 MPa in 100 MPa decrements using a Hyperjet waterjet pump system (Flow International Corporation, Kent, Wash.) equipped with zirconia-based pistons. The milk was maintained at high pressure by a ceramic intensifier pump and sprayed through a 4 µm (i.d.) pore size diamond nozzle. To minimize the shear-induced increase in temperature, the spray of HPJ milk from the nozzle was contained in a tube in tube heat exchanger (5.08 cm inner diameter, 7.62 cm outer diameter, 122 cm height, custom made) connected to a controlled temperature glycol bath (Isotemp 3016D, Fisher Scientific, Pittsburgh, Pa., U.S.A.) set at −32° C. At the exit of the heat exchanger, HPJ processed liquid samples (SM 100 to 500 MPa) were collected in glass flasks to a volume of approximately 500 mL. A 500 mL-aliquot of SM, not run through the Hyperjet system was considered as control (control SM). Milk samples were kept at 4° C. until use, analysis were conducted within three days of the HPJ process. Before and after HPJ, the pump was cleaned with DI water and a neutral detergent (Softclean No. 379, Hydrite, Brookfield, Wis.) and then rinsed with DI water.

Determination of Foaming and Emulsifying Properties

Milk foams were prepared by following the method described previously (Giardina, C., et al. *Milchwissenschaft-Milk Science International*, 59(9-10), 476-479). Briefly, 10 mL of HPJ skim milk (SM 100 to 500 MPa) and non-processed control (SM 0 MPa) were placed in a 50 mL tube and stirred by using a vortex (Analog vortex mixer, Thermo Fisher Scientific, Inc., Waltham, Mass.) at the maximum speed for 1 min, in order to obtain a suitable amount of foam. Experiments were carried out by duplicate.

Both foamability and stabilizing properties were determined based on the method described by Giardina et al. (2004). The foamability of assayed samples was expressed as its foam expansion index (% FE), which is defined as initial foam volume, including any drained liquid ($F_0$, measured at 1 min after the start of whipping), as follows:

$$\% \text{ FE} = [(F_0 - 10)/10] \times 100 \quad [1]$$

To evaluate the foam stability, the foam was allowed to stand for 24 h at room temperature and the volume of drained liquid and foam were measured at 5 min, 15 min, 1 h, 5 h and 24 h. Foam stability was expressed as its foam volume stability index (% FVS), which is defined as the percent foam volume remaining after 5 min ($Vf_{5\ min}$), 15 min ($Vf_{15\ min}$), 1 h ($Vf_{1\ h}$), 5 h ($Vf_{5\ h}$), or 24 h ($Vf_{24\ h}$) relative to the initial foam volume:

$$\% \text{ FVS} = (Vf_{5\ min, 15\ min, 1\ h, 5\ h, 24\ h}/F_0) \times 100 \quad [2]$$

So that, a % FVS value of 50 would correspond to the called half-life of the foam. Measurements of foam-forming ability and stability were performed in duplicate.

An Ultra-turrax type TP 18/10 rotary homogenizer (Janke and Kunkel of IKA Labortechnik) working at 16,000 rpm for 1 min was employed for the preparation of emulsions with a ratio sunflower oil:SM of 1:4 (v:v).

Both the emulsion-forming and stabilizing properties of HPJ SM (SM 100 to 500 MPa) and non-processed control (SM 0 MPa) were evaluated by spectroturbidity. For emulsifying activity determination, 10 µL were taken immediately after the emulsion was formed and were diluted 1,000-fold into 0.1% (w/v) SDS in 0.1 M NaCl, pH 7.0. The tubes were inverted three times to obtain homogeneous mixtures, and then absorbance at 500 nm was recorded using a Beckman DU 70 spectrophotometer (Beckman Instruments Inc., Fullerton, Calif.). The emulsifying activity was expressed as its emulsifying activity index (EAI, $m^2 \cdot g^{-1}$), being $$\text{EAI} = 2Td/\phi c \quad [3]$$

where T is turbidity=2.303 A/l (A=absorbance at 500 nm and l=light path in meters=$10^{-2}$), $\phi$ is the oil phase volume ratio=0.2, c is the protein concentration in $g \cdot m^{-3}$, and d is the dilution factor=1,000.

To evaluate the emulsion stability, the stock emulsions prepared above were held at room temperature for 24 h. After stirring for 15 min, aliquots were diluted and turbidity was measured as described above ($EAI_{24\ h}$). The 24-hour-old emulsions were then heated at 80° C. for 30 min. After cooling to room temperature and stirring, turbidity was again measured as above ($EAI_{80°\ C.}$). The emulsion stability was calculated by:

$$\Delta \text{EAI} \% = [(EAI_{max} - EAI_{80°\ C.})/(EAI_{max})] \cdot 100 \quad [4]$$

where $EAI_{max}$ is the maximum value between EAI and $EAI_{24\ h}$. The smaller the value of ΔEAI %, the better the stability. Measurements of emulsifying activity and stability were performed in duplicate.

Cryo-Transmission Electron Microscopy and Spectrophotometer analysis of HPJ Milk Samples Cryo-TEM was done for all milk samples subjected. The milk samples were diluted using protein free serum (PFS) immediately before microscopy. The PFS was obtained by tangential flow ultrafiltration of skim milk (3 kDa MWCO; PLBC Prep scale TFF Cartridge, Millipore, Billerica, Mass.)) and stored at −40° C. The PFS was thawed before use, centrifuged at 5200×g for 20 min and filtered using a 45 micron PVDF filter prior to sample preparation. The milk dilutions were prepared in a 1 mL tube with 10 μL of 0 MPa milk in 500 μL PFS and 5 μL of 500 MPa milk in 500 μL PFS, respectively. The diluted milk sample (5 μL) was then dispensed on to a 200 mesh grid holey grid (Lacey carbon film grid, R2/1 Quantifoil Micro Tools, Jena, Germany) held in place for cryo-sample preparation using a Gatan Cp3 Cryoplunge (Gatan Inc., Pleasanton, Calif.). The samples were blotted for 3 sec for 0 MPa milk and 2.5 sec for 500 MPa milk. The grids with samples were frozen by plunging in to liquid ethane at −182° C. and then transferred to a cryo-sample holder. The frozen samples were then observed using a Zeiss Libra 200 MC electron microscope at 200 kV (Carl Zeiss Inc., Fort Lauderdale, Fla.) with a 2K/2K camera and imaging unit using the Digital Micrograph™ software (Gatan Inc., Pleasanton, Calif.). The diameter of the casein micelles was measured using ImageJ image analysis software package (National Institutes of Health, Bethesda, Md., USA, http://imagej.nih.gov/ij/). The absorbance at 550 nm of diluted samples pH-adjusted (to pH 7) was also measured as an indicator of turbidity using a UV-Vis spectrophotometer (Biomate 5, Thermo Fisher Scientific, Waltham, Mass.).

Measurement of the Intrinsic Fluorescence of HPJ Milk Samples

The intrinsic fluorescence ($S_1$) was measured for milk subjected to different HPJ pressures. All the HPJ milks were diluted to three concentrations 25, 35 and 45 μL of milk in 1 mL of PFS. The milk samples thus prepared were stored in the refrigerator for 17 h, vortexed for 30 sec and left to equilibrate to room temperature for 3 h. The samples were vortexed thoroughly before measuring the fluorescence intensity at an excitation wavelength ($\lambda_{ex}$) of 280 nm and 295 nm with the emission wavelength ($\lambda_{em}$) ranging from 300 to 600 nm (slit width—10 mm, sensitivity—Low). The slope from the linear regression of the maximum fluorescence intensities of a particular milk sample at different concentration is represented as an index for the intrinsic fluorescence ($S_1$). Three replications of HPJ milk samples were measured for intrinsic fluorescence.

Statistical Analysis

Statistical analysis of results from turbidity, surface hydrophobicity and intrinsic fluorescence was carried out by using SAS 9.3 for Windows (mean separation by Tukey-Kramer test). The results from determination of foaming and emulsifying properties were statistically analysed by using SPSS for Windows version 19.0. Univariate analysis of variance (ANOVA) (least squares means, Tukey's significant difference test) was used to determine the statistical differences between the functionality of HPJ and non-processed milk samples. Differences were considered significant when P<0.05. HPJ experiments were performed by triplicate and all analyses were carried out in duplicate, so that showed results are the mean values (n=6)±SE, except for turbidity which has been calculated from duplicate samples

EXAMPLE 3

Figure 9:
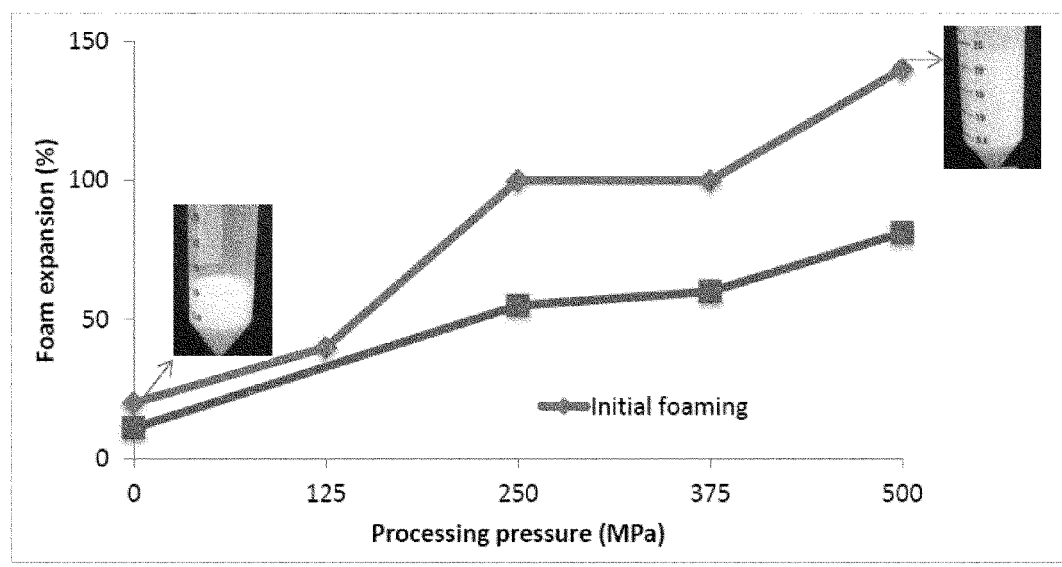
FIG. 9. Percent foam expansion of whole milk processed using high pressure jet technology at pressure ranging from 0 to 500 MPa.

Whole milk (3.98% fat; 5.02% total solids) was processed using the high pressure jet (previously described) at pressures 0, 125, 250, 375, and 500 MPa. After processing, milk was vortexed (Fisher Scientific, Analog Vortex Mixer) for one minute. The percent foam expansion was calculated immediately after processing and one hour after foaming, using the following formula:

$$\text{Foam expansion}(\%) = 100 \cdot \left( \frac{V_V - V_0}{V_0} \right)$$

Where Vv is the volume of milk after vortexing and Vo is the initial volume of milk (10 mL) FIG. 9 shows that the percent foam expansion reached 140% when whole milk was processed at 500 MPa and that one hour later the foam expansion was 80% when whole milk was processed at 500 MPa.

EXAMPLE 4

Figure 10:
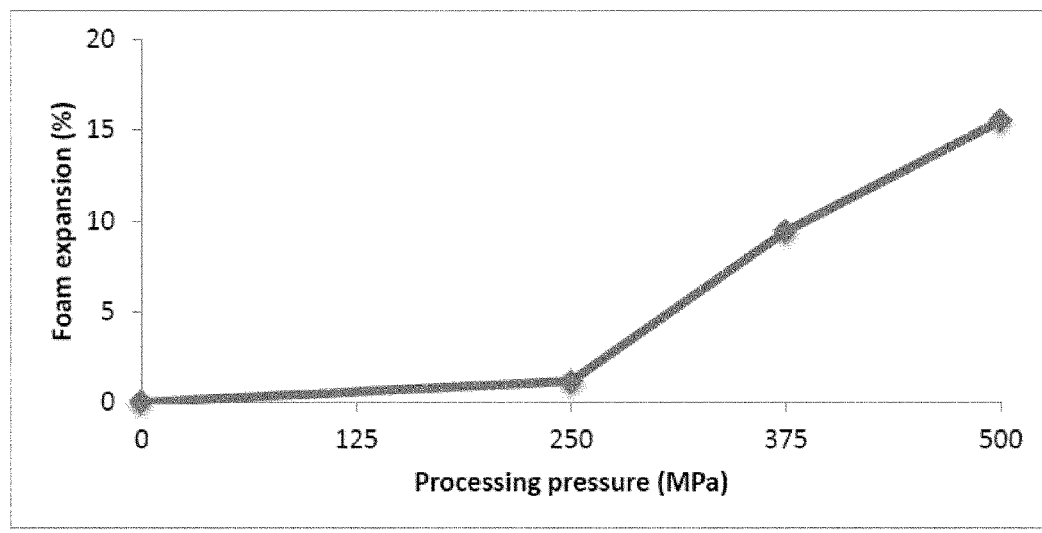
FIG. 10. Foam expansion (%) in ice cream mix processed using high pressure jet at pressure 0, 250, 375, and 500 MPa.

Without intending to be limited by any particular theory, it is considered that use of high pressure processing of milk improves foaming properties, among other characteristics, after the high pressure application. This Example demonstrates high pressure processing of ice cream and creation of a foam during the processing. In order to demonstrate this, ice cream mix (Table 1) was processed at 0, 250, 375, and 500 MPa. The foam expansion (%) was calculated for samples right after processing, without vortexing. FIG. 10 shows that ice cream mix reached almost 16% foam expansion after the ice cream mix was processed at 500 MPa.

TABLE 1

Composition of ice cream mix processed using High Pressure Jets processing

| Ingredients | kg |
| --- | --- |
| Cream (40.21% MF; 5.02% MSNF) | 3.84 |
| Milk (3.98% MF; 8.96% MSNF) | 12.23 |
| NFDM | 1.21 |
| Sugar | 3.06 |
| Stabilizer | 0.043 |
| Emulsifier | 0.027 |
| Total | 20.41 |

While the disclosure has been particularly shown and described with reference to specific embodiments (some of which are preferred embodiments), it should be understood by those having skill in the art that various changes in form and detail may be made therein without departing from the spirit and scope of the present disclosure as disclosed herein.

What is claimed is:

1. A method for preparing a food additive comprising a processed pasteurized skim milk component that exhibits a foam volume stability index (FVS) that is improved relative to a FVS of pasteurized skim milk that has been subjected to High Pressure Jet Processing (HPJ) at a hydrostatic pressure of 500 MPa, the method comprising subjecting the pasteurized skim milk to HPJ, at a hydrostatic pressure of 400 MPa, the method further comprising mixing the pasteurized skim milk subsequent to exposing to the hydrostatic pressure of 400 MPa to provide as the food additive the foam that exhibits the improved FVS.

2. A food product comprising a food additive, the food additive comprising the processed pasteurized milk component of claim 1.

3. The food product of claim 2, wherein the product does not contain any lecithin.

4. The food product of claim 2, wherein the food product is a dairy product.

5. The food product of claim 2, wherein the food product is a non-dairy product.

6. A method of making a food product comprising an emulsifier, the method comprising subjecting pasteurized skim milk to High Pressure Jet Processing HPJ at a hydrostatic pressure of 400 MPa, subsequent to exposing the pasteurized skim milk to the hydrostatic pressure, isolating the processed pasteurized skim milk component to obtain an isolated processed milk component, and adding the isolated processed pasteurized skim milk component to the food product to obtain the food product comprising the emulsifier.

7. The method of claim 6, wherein the processed milk component comprises a foam that exhibits a foam volume stability index (FVS) that is improved relative to a FVS of pasteurized skim milk that has been subjected to HPJ at a hydrostatic pressure of 500 MPa.

8. The method of claim 6, wherein the processed pasteurized skim milk component comprises casein.

9. The method of claim 1, wherein the improved FVS remains present for at least one hour after the mixing to provide the foam.

10. The method of claim 1, wherein the improved FVS remains present five hours after the mixing to provide the foam.

\* \* \* \* \*